US008638426B2

(12) United States Patent
Oron et al.

(10) Patent No.: US 8,638,426 B2
(45) Date of Patent: Jan. 28, 2014

(54) SEA CLUTTER IDENTIFICATION WITH A LASER SENSOR FOR DETECTING A DISTANT SEABORNE TARGET

(75) Inventors: Moshe Oron, Rehovot (IL); Doron Nevo, Ra'anana (IL); Hanna Inbar, Hod Hasharon (IL)

(73) Assignee: Israel Aerospace Industries Ltd., Lod (IL)

( * ) Notice: Subject to any disclaimer, the term of this patent is extended or adjusted under 35 U.S.C. 154(b) by 340 days.

(21) Appl. No.: 13/063,354

(22) PCT Filed: Sep. 10, 2009

(86) PCT No.: PCT/IL2009/000881
§ 371 (c)(1),
(2), (4) Date: Mar. 10, 2011

(87) PCT Pub. No.: WO2010/029544
PCT Pub. Date: Mar. 18, 2010

(65) Prior Publication Data
US 2011/0164240 A1 Jul. 7, 2011

(30) Foreign Application Priority Data

Sep. 11, 2008 (IL) .......................................... 194029

(51) Int. Cl.
*G01C 3/08* (2006.01)
(52) U.S. Cl.
USPC ......... 356/5.01; 356/4.01; 250/577; 250/573; 367/131
(58) Field of Classification Search
USPC .......... 356/5.01, 4.01; 250/577, 573; 367/131
See application file for complete search history.

(56) References Cited

U.S. PATENT DOCUMENTS

| 3,669,540 A | | 6/1972 | Rattman et al. |
| 4,518,254 A | | 5/1985 | Penny et al. |
| 4,754,151 A | | 6/1988 | Billard |
| 5,261,629 A | * | 11/1993 | Becker et al. ................ 244/3.22 |
| 5,644,508 A | * | 7/1997 | McNary et al. ............... 342/159 |
| 6,317,388 B1 | * | 11/2001 | Woodsum et al. ............ 367/131 |
| 6,388,246 B1 | | 5/2002 | Fry et al. |
| 7,057,199 B2 | * | 6/2006 | Perry ............................ 250/577 |
| 7,175,130 B2 | * | 2/2007 | Dubois et al. ................ 244/3.13 |
| 7,579,828 B2 | * | 8/2009 | Laforest et al. .......... 324/207.11 |
| 7,711,147 B2 | * | 5/2010 | Koike et al. .................... 382/103 |
| 2003/0082867 A1 | * | 5/2003 | Gonzales et al. ............. 438/200 |
| 2010/0021378 A1 | * | 1/2010 | Rousso et al. ............... 424/1.11 |

FOREIGN PATENT DOCUMENTS

| GB | 1168854 | 10/1969 |
| GB | 2 005 834 A | 4/1979 |
| WO | WO 02/099505 A1 | 12/2002 |
| WO | WO 03/064970 A1 | 8/2003 |

* cited by examiner

*Primary Examiner* — Isam Alsomiri
*Assistant Examiner* — Samantha K Abraham
(74) *Attorney, Agent, or Firm* — Oliff & Berridge, PLC

(57) ABSTRACT

There is provided a system for detecting distant seaborne objects by an airborne vehicle, including a seeker head having an axis in the direction of flight, a sensor mounted on the seeker's head, the sensor being operative to transmit towards the sea surface a laser radiation beam of selected wavelength and to receive from the sea water surface radiation reflected from the sea water surface and from a seaborne object, and a computing unit for differentiating between the reflection received from the sea water surface and from the seaborne object. A method for detecting distant seaborne objects by an airborne vehicle is also provided.

12 Claims, 4 Drawing Sheets

SEA CLUTTER IDENTIFICATION WITH A LASER SENSOR FOR DETECTING A DISTANT SEABORNE TARGET

CROSS-REFERENCE TO RELATED APPLICATIONS

This application is a PCT National Phase of International Patent Application No. PCT/IL2009/000881 filed Sep. 10, 2009, which claims priority from Israel Application No. 194029 filed in the Israel Patent Office on Sep. 11, 2008, the entire disclosures of which are hereby incorporated by reference in their entireties.

FIELD OF THE INVENTION

The present invention relates to a system and method for detecting distant objects, and more particularly to a system for remote identification and determination of the location of a seaborne vehicle, e.g., a boat. More specifically, the present invention is also concerned with an airborne projectile or missile (hereinafter a "seeker") head bearing such a system, which may advantageously be equipped with proximity sensors for timely triggering an explosive.

BACKGROUND OF THE INVENTION

Various lasers are used today as proximity detectors for target seeker heads. Most of the employed systems are fast range finders determining the distance from the seeker head to the target, and when this distance is below a predetermined value, the proximity detectors activate the explosive material.

The existing proximity detection systems operate effectively in an airborne atmosphere, where no adjacent bodies generate reflections of the laser range finder. In ground applications, greater care must be taken not to be triggered by dust or clatter, and hence targets are identified by their size and shape or by other means such as temperature and magnetism.

The location of small boats on the sea water surface is a challenge due to the small dimensional features of the boats which are of the same magnitude as the sea waves, and thus, in such cases, a novel approach is required.

SUMMARY OF THE INVENTION

In accordance with the present invention, there is provided a system for detecting distant seaborne objects by an airborne vehicle, comprising a seeker head having an axis in the direction of flight, at least one sensor mounted on said seeker's head, said sensor being operative to transmit towards the sea surface a laser radiation beam of selected wavelength and to receive from the sea water surface radiation reflected from the sea water surface and from a seaborne object, and computing means for differentiating between the reflection received from the sea water surface and from the seaborne object.

The invention further provides a method for detecting distant seaborne objects by an airborne vehicle, comprising providing a system according to claim 1, irradiating said sea water surface with at least one laser beam of a predetermined selectable wavelength, receiving by radiation detectors radiation reflected from the sea water surface and possibly from a seaborne object and converting received radiation into corresponding computable signals, and computing the received signals to differentiate between the reflection received from the sea water and from a seaborne object.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic representation of a seeker head emitting signals impinging on a sea surface, in accordance with the present invention;

FIG. 2 is a schematic representation of a seeker head emitting signals, impinging on a seaborne object, according to the embodiment of FIG. 1;

FIG. 3 is a front view of the two sets of proximity sensors shown in FIGS. 1 and 2, in accordance with the present invention, and FIGS. 4A to 4D illustrate intensity versus time curves of reflected pulses as received by the seeker's head.

DETAILED DESCRIPTION OF THE PREFERRED EMBODIMENTS

Figure 1:
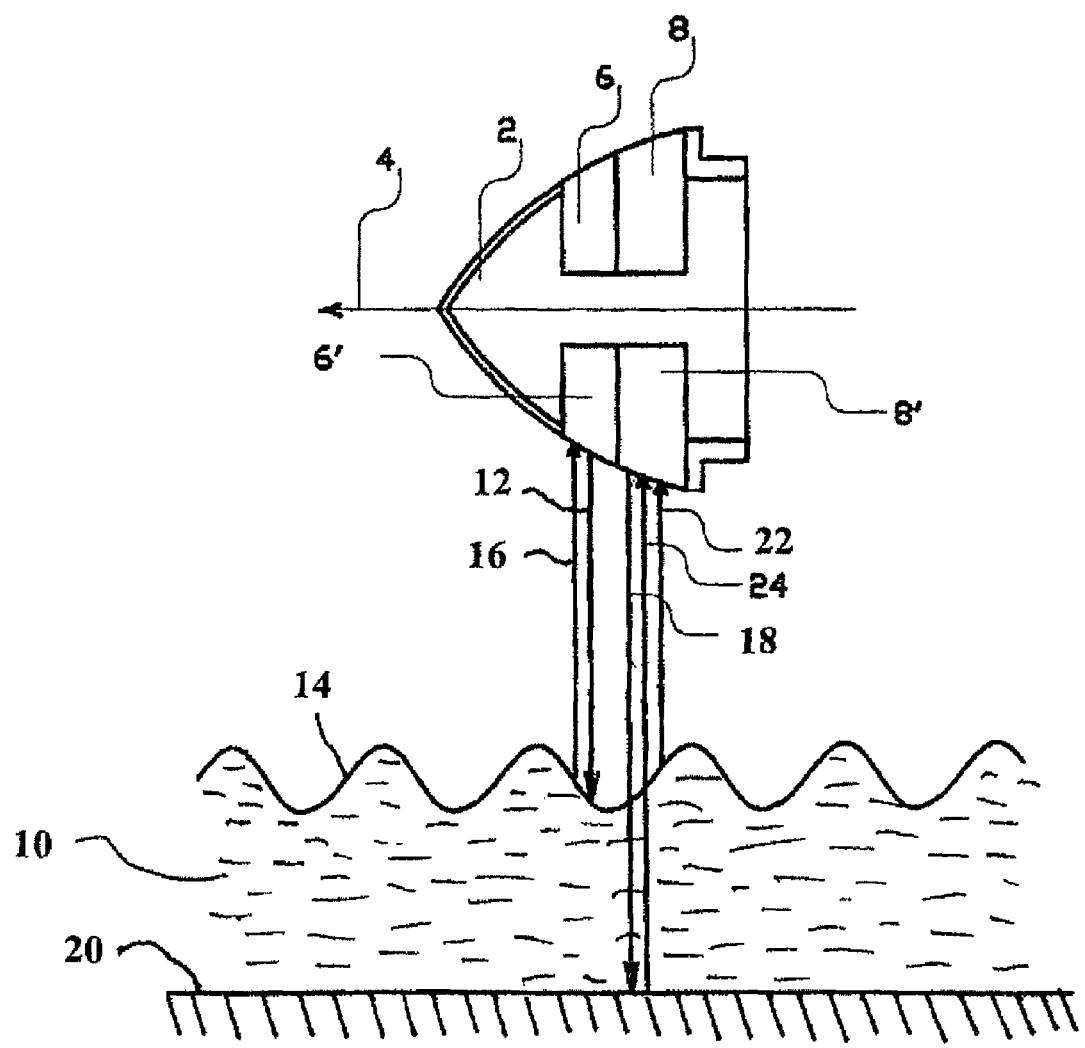
Figure 3:
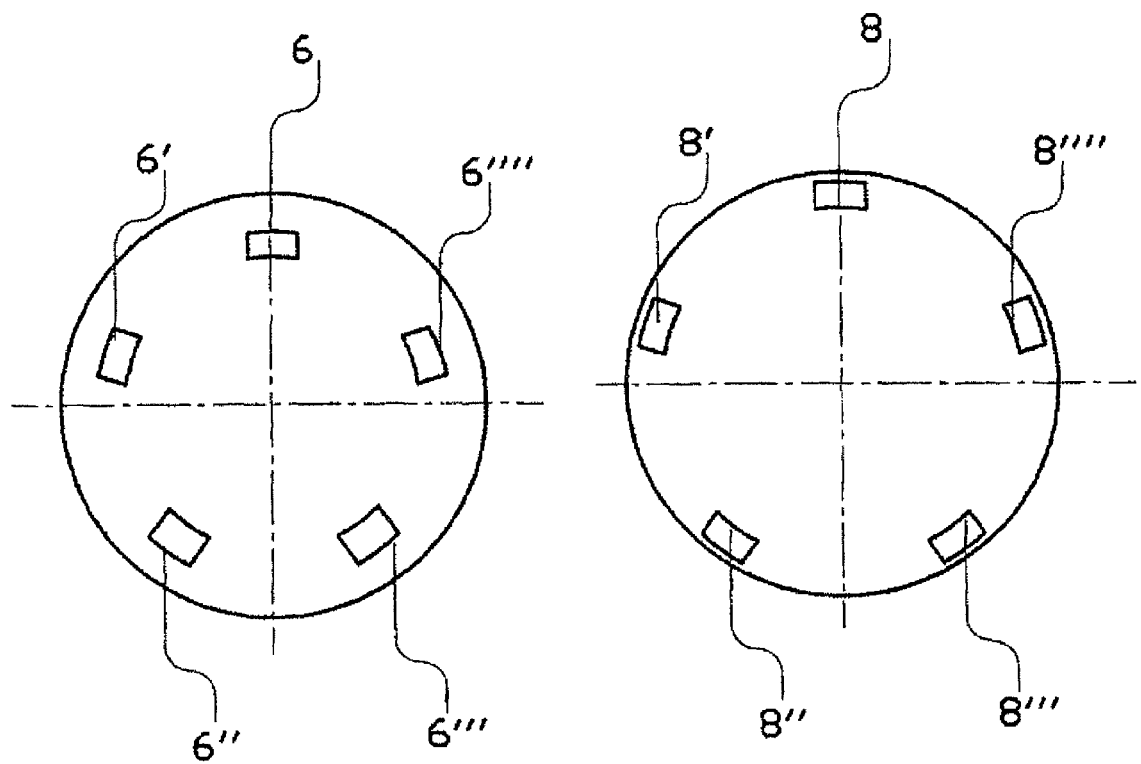

Referring now to the Figures in detail illustrating a preferred embodiment of a laser object seeker system, and first referring to FIGS. 1 and 3, there are shown schematic representations of a seeker head 2, e.g., a cylindrical, tapered or conical head, moving forward in direction 4, also constituting the seeker's head axis. On the seeker head 2 there are located a plurality of laser proximity sensors (PS's) 6 to 6'''' and 8 to 8'''' (see FIGS. 1 and 3) pointing sideways into the sea water 10. One or more of the PS's 6 to 6''' emit a laser beam 12 in the direction of the sea water 10. The laser wavelength of the beams is selected so as not to penetrate the sea water 10 and to be reflected from the sea surface 14, back in direction 16 into at least one of the dedicated detectors of the PS's 6 to 6'''. Further seen are a plurality of laser PS's 8 to 8'''' pointing sideways and emitting laser beams 18 in the direction of the sea water 10. The laser wavelength of the beams of these PS's is selected to penetrate the sea water 10, to be partially reflected from the sea water surface 14 and partially reflected by the sea bed 20, back in directions 22 and 24 respectively, into dedicated detectors of PS's 8 to 8''''. As the reflected amplitude and time of the beams are known, they are used to determine the various reflection distances, as per-se known. In this embodiment, the PS 6' serves as a reference measuring distance to the surface 14 and PS 8' measures the depth of the sea bed 20. While in the shown embodiment, the PS's point sideways, in other embodiments the PS's may be arranged on the seeker's head 2 to point at a downwardly angle forwards in the direction of flight. Also, the seeker's head 2 may be rotatable about its axis.

Computing means for differentiating between the reflections received from the sea water surface, possibly from the sea bed and from a seaborne object may be included in the seeker's head or in any other part of the airborne vehicle.

Figure 2:
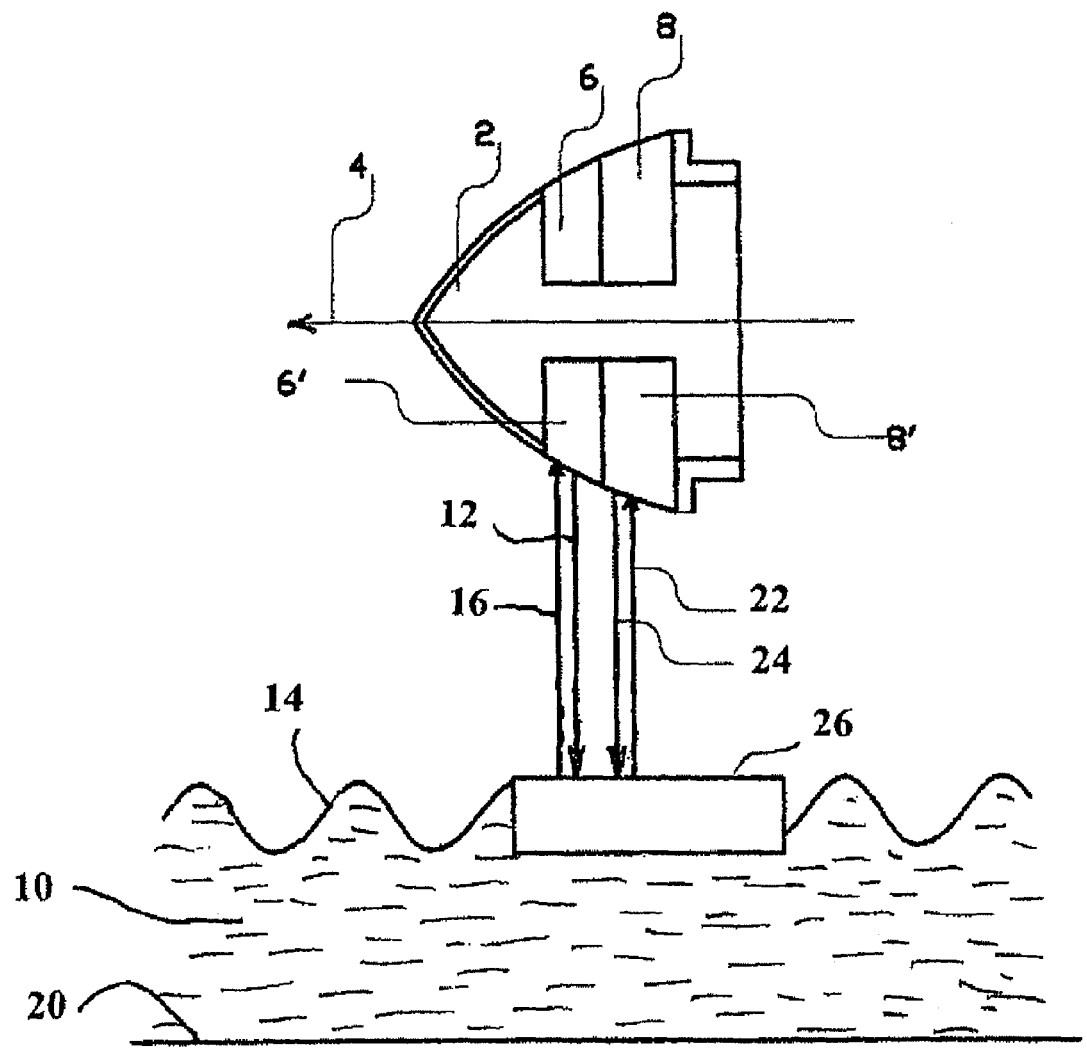

FIG. 2 illustrates a schematic representation of the seeker head 2, moving forward in direction 4 and having a plurality of PS's 6 to 6' and 8 to 8"" pointing sideways. At least one of the PS's 6 to 6' emits a laser beam 12 in the direction of the sea surface 14 where seaborne object 26, e.g., a boat is present. The laser wavelength is selected not to penetrate the seawater 10 and to be reflected in direction 16 from the sea water surface 14 or from the seaborne object 26 into the dedicated detectors of PS's 6 to 6'. A plurality of laser PS's 8 to 8"" point sideways and emit laser beams 14 towards the sea water 10. The laser wavelength of the beams is selected to penetrate the sea water 10 and to be partially reflected in direction 22 from sea water surface 14, and sea bed 20, into dedicated detectors of the PS's 8 to 8"". As can be seen, in this case, however, the reflection surface of the beam is the reflection from the seaborne object 26 in direction 22. The reflected amplitude and time of the beam determine the various distances, as per-se known, with the PS 6 serving as a reference measuring distance to the water and the PS 8 measuring the sea depth.

Figure 4:
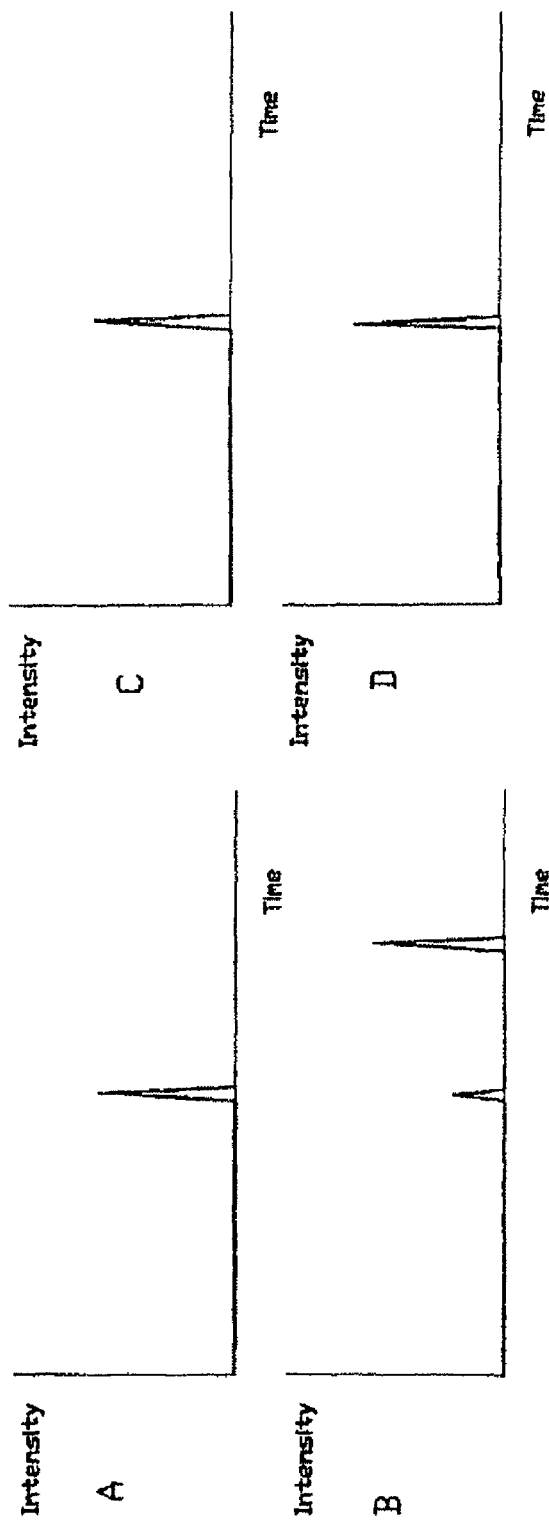

In FIG. 4A there is illustrated a signal produced by detectors of PS's 6 to 6"", while FIG. 4B shows the signals produced by the detectors of PS's 8 to 8" for sea water.

In FIG. 4C there is illustrated signal produced by the detectors of PS's 6 to 6"" while FIG. 4D shows a signal produced by the detectors of PS's 8 to 8', which in this case, have equal timing and distance received from a seaborne object.

The methods of operating the systems described with reference to FIGS. 1 to 4 will now be briefly described.

According to an embodiment of a method of operation of the present invention, a single laser beam is used, where the laser beam is selected to enhance or reduce seaborne object laser reflection in comparison with the sea waves.

According to a further embodiment of a method of operation of the present invention, there is provided a laser beam that penetrates the sea water, e.g., green laser light, wherein the impingement on the seaborne object results in a single reflection as compared with a double reflection, one from the sea water surface and one from the sea bed, when the laser radiation impinges on the sea waves.

A further method of operation of the present invention provides for two laser beams which are selected such that one penetrates the sea water, e.g., green laser light, where the impingement of the laser radiation on the seaborne object forms a single reflection as compared with a double reflection, one from the sea surface and one from the sea bed, when laser radiation impinges on the sea waves, and a second beam of a non-penetrating wavelength, e.g., a red laser, serving as a reference, where the impingement on the seaborne object or the sea waves results in a single reflection.

According to still a further method of operation of the present invention, two laser beams are selected, one that penetrates the water, e.g., green laser light, and a second, non-penetrating wavelength, e.g., a red laser, where the two laser beams operate simultaneously and share an equivalent optical path using the same single detector, wherein each of the laser beams is modulated by a different RF carrier. The detector's output RF signals are used to differentiate between the seaborne object and the sea, and the impingement on the object will result in a similar reflection pattern for both wavelengths (displayed by similar, highly correlated temporal envelopes of received RF signals), whereas the impingement from the sea will show variations in the reflection pattern between the two wavelengths, displayed by a lower correlation between the correspondingly received RF signals.

A further method of operation of the present invention provides for multiple laser proximity detectors placed on the circumference of the seeker's head, as shown in FIG. 3, enabling detection by a rotating seeker and either being redundant, or alternatively, enabling higher computation speed.

According to a further method of operation of the present invention, laser proximity detectors based on time-of-flight are placed on the seeker, and are continuously utilized. Similarly, laser proximity detectors based on phase detection may be placed on the seeker's head, or laser proximity detectors based on triangulation computations, may be utilized.

A further method of operation according to the present invention calls for laser proximity detectors data to be analyzed and processed by an on-board computing system and dedicated algorithms, and finally, according to yet a further method, multiple laser proximity detectors are oriented such as to impinge on the sea water surface at a distance higher than the target size, where the similarity or dissimilarity between the signals is used to distinguish between sea water and a target.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for detecting a seaborne object situated on the surface of the water by an airborne vehicle, comprising:
   a seeker head having an axis in the direction of flight;
   at least one sensor mounted on said seeker head; said at least one sensor being operative to transmit towards the sea water surface at least a first laser radiation beam of a wavelength selected to provide a radiation that can penetrate sea water, and to receive radiation reflected from the direction of the sea water surface;
   the system having at least one of the following configurations:
   a. a detector for detecting reflection received from the direction of the sea water surface, wherein the radiation impinging on a seaborne object results in a single reflection from the seaborne object, and the reflection impinging on the sea water surface results in a double reflection including a first part reflected from the sea surface and a second part reflected from under the sea surface and wherein each of said first and second parts travel a different distance; and
   a computing system for differentiating between the reflection received from the direction of the sea water surface and determining whether a single reflection or a double reflection is received, and in case of a single reflection detecting said sea borne object;
   b. said at least one sensor being operative to transmit towards the sea water surface at least a second laser radiation beam of a wavelength selected to provide a radiation that does not penetrate sea water;
   a first detector for detecting a reflection of said first laser beam;
   a second detector for detecting a reflection of said second laser beam; and
   a computing system for utilizing the reflection of said second beam as a reference to the reflection of said first beam and in case the reflection of said first beam and the reflection of said second beam are the same detecting said seaborne object.

2. The system as claimed in claim 1, wherein at least one sensor is pointing at an angle to said axis, said angle is different than a zero angle and thus pointing towards the sea water surface.

3. The system as claimed in claim 1, wherein said at least one sensor is a proximity sensors.

4. The system as claimed in claim 1, wherein said seeker head is conically shaped and multiple laser sensors are mounted on the circumference of the seeker's head, enabling detection when the seeker head rotates.

5. The system as claimed in claim 1, wherein said at least one sensor is based on time-of-flight detection.

6. The system as claimed in claim 1, wherein said at least one sensor is based on phase detection.

7. The system as claimed in claim 1, wherein said at least one sensor is based on triangulation computation.

8. The system as claimed in claim 1, wherein multiple laser radiation sensors are mounted on the seeker's head and oriented such as to impinge on the sea surface at a distance higher than the seaborne object's size.

9. A method for detecting a seaborne object situated on the surface of the water by an airborne vehicle, comprising:
   transmitting towards the sea water surface a first laser radiation beam of a wavelength selected to provide a radiation that penetrates sea water;
   transmitting towards the sea water surface a second laser radiation beam of a wavelength selected to provide a radiation that does not penetrate sea water;
   detecting a first reflection of said first laser beam;
   detecting a second reflection of said second laser beam; and
   differentiating between the first and the second reflections, and in case no difference is found, detecting said seaborne object.

10. The method according to claim 9, wherein said first laser beam and said second laser beam are simultaneously operated and share an equivalent optical path using a single detector, each of the laser beams being modulated by a different RF carrier and wherein radiation impinging on a seaborne object results in the detection of two RF signals with similar temporal envelopes, whereas the impingement of radiation on the sea water, results in the detection of two RF signals with different temporal envelopes; the method comprising:
   detecting a first RF signal being a reflection of said first laser beam and a second RF signal being a reflection of said second laser beam; and
   differentiating between the first and the second RF signals, and in case no difference is found, detecting said seaborne object.

11. The method as claimed in claim 9, wherein laser radiation proximity sensors data are analyzed and processed by an on-board computing system and dedicated algorithms.

12. A method for detecting a seaborne object situated on the surface of the water, by an airborne vehicle, comprising:
   transmitting towards the sea water surface a laser radiation beam of a wavelength selected to provide a radiation that penetrates sea water;
   detecting a reflection of said laser beam;
   detecting reflection received from the direction of the sea water surface, wherein the radiation impinging on a seaborne object results in a single reflection from the seaborne object, and the reflection impinging on the sea water surface results in a double reflection including a first part reflected from the sea surface and a second part reflected from under the water surface and wherein each of said first and second parts travel a different distance; and
   differentiating between the reflection received from the direction of the sea water surface and determining whether a single reflection or a double reflection is received, and in case of a single reflection detecting said sea borne object.

* * * * *